United States Patent
Sankar et al.

(10) Patent No.: US 8,600,725 B2
(45) Date of Patent: Dec. 3, 2013

(54) SYSTEM AND METHOD FOR PROVIDING A STATIC MODEL MAP OF BEHAVIORS IN A MIDDLEWARE SYSTEM, FOR USE IN IDENTIFYING SYSTEM PROBLEMS

(75) Inventors: Raji Sankar, Bangalore (IN); Govinda Raj Sambamurthy, Bangalore (IN); Rahul Goyal, Bangalore (IN); Apoorv Anand Vajpayee, Bangalore (IN); Sandeep Pandita, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 305 days.

(21) Appl. No.: 13/009,800

(22) Filed: Jan. 19, 2011

(65) Prior Publication Data

US 2012/0185232 A1 Jul. 19, 2012

(51) Int. Cl.
*G06F 9/45* (2006.01)
*G06F 9/44* (2006.01)

(52) U.S. Cl.
USPC .......................................... 703/22; 717/124

(58) Field of Classification Search
USPC ........................................... 703/22; 717/124
See application file for complete search history.

(56) References Cited

U.S. PATENT DOCUMENTS

| | | | |
|---|---|---|---|
| 5,222,065 A | 6/1993 | Krogmann | |
| 5,257,358 A | 10/1993 | Cohen | |
| 5,958,009 A | 9/1999 | Friedrich | |
| 6,018,300 A | 1/2000 | Dowden | |
| 6,049,666 A * | 4/2000 | Bennett et al. | 717/130 |
| 8,219,997 B2 | 7/2012 | Shimizu et al. | |
| 2001/0034663 A1 | 10/2001 | Teveler | |
| 2005/0172306 A1 | 8/2005 | Agarwal et al. | |
| 2011/0145651 A1 | 6/2011 | Molnar et al. | |
| 2012/0216205 A1 | 8/2012 | Bell et al. | |
| 2012/0284719 A1 | 11/2012 | Phan et al. | |
| 2012/0304182 A1 | 11/2012 | Cho et al. | |

* cited by examiner

*Primary Examiner* — David Silver
(74) *Attorney, Agent, or Firm* — Fliesler Meyer LLP

(57) ABSTRACT

A system and method for providing a static model map of behaviors in a middleware system, for use in identifying problems. In accordance with an embodiment, the system provides a view of the system which allows for analysis of the various components. Locations within the system where a request spends its time are categorized into either "wait" or "execution" locations. The components exhibit static behaviors which affect the response time and can be predefined for different types of components and analyzed independently. In turn the behaviors can be classified as either "wait" or "execution", each of which can be considered aspects of a component. Each aspect of a component must satisfy the same efficiency/inefficiency as defined by the requirements on the system. An aspect that does not meet the criteria is considered a "problem aspect" and is analyzed further to find the cause of the problem.

20 Claims, 5 Drawing Sheets

SYSTEM AND METHOD FOR PROVIDING A STATIC MODEL MAP OF BEHAVIORS IN A MIDDLEWARE SYSTEM, FOR USE IN IDENTIFYING SYSTEM PROBLEMS

CROSS REFERENCE TO RELATED APPLICATIONS

This application is related to the following U.S. patent applications, each of which is incorporated by reference herein in its entirety:

U.S. patent application Ser. No. 13/009,775 entitled "SYSTEM AND METHOD FOR DETERMINING CAUSES OF PERFORMANCE PROBLEMS WITHIN MIDDLEWARE SYSTEMS", by Govinda Raj Sambamurthy et al., filed on Jan. 19, 2011;

U.S. patent application Ser. No. 13/009,788 entitled "SYSTEM AND METHOD FOR USING DEPENDENCY IN A DYNAMIC MODEL TO RELATE PERFORMANCE PROBLEMS IN A COMPLEX MIDDLEWARE ENVIRONMENT", by Govinda Raj Sambamurthy et al., filed on Jan. 19, 2011;

U.S. patent application Ser. No. 13/009,777 entitled "METHOD OF MEASURING AND DIAGNOSING MISBEHAVIORS OF SOFTWARE COMPONENTS AND RESOURCES" by Raji Sankar et al., filed on Jan. 19, 2011; and U.S. patent application Ser. No. 13/009,781 entitled "EFFICIENT DATA COLLECTION MECHANISM IN A MIDDLEWARE RUNTIME ENVIRONMENT", by Raji Sankar et al., filed on Jan. 19, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to the diagnosis of problems in middleware and other software systems, and is particularly related to providing a static model map of behaviors for use in identifying system problems, including use of the static model map to group system behaviors into different categories, and assign behavioral patterns to those categories.

BACKGROUND

Software middleware systems, such as Oracle WebLogic Server, typically use multiple components (e.g. software services, resources, and other components) that work together to process incoming requests. When a problem occurs in a higher level service this problem can be a manifestation of a misbehavior in one of the underlying components servicing the request. As such, to fully diagnose a problem with a particular request it is often necessary to look at all of the components in the middleware system that are participating in servicing that particular request.

Tracking the various components through which a request flows, to detect those components contributing to a problem in the request, can be a complex undertaking. Generally, such an analysis mandates that for every request problem analyzed, a new set of components must also be analyzed to detect those particular components that contribute to that particular problem. It is possible that the same components are used by multiple requests, and hence one request may impact another request. As such, when the components are analyzed they need to be analyzed in the context of all requests coming into the system. Looking at a runtime view of a large middleware system to analyze that system creates a complex tangled network of components.

Creating a complex network of components additionally requires a lot of data to detect relations. Unless a hook exists in the path of the executing request for all components, then creating an accurate picture of this network is not practical. Complex representations also increase the time needed to perform the analysis, and potentially introduce duplicate analysis on the same components based on various requests. Further analyzing this complex network generally requires analyzing all of the components in the request flow as one whole. If any components are missed, then the system must be able to properly discount it in the overall flow, before analyzing the rest of the components. These problems prevent, for example, a phased implementation, where, e.g. a first phase analyzes Java Database Connectivity (JDBC) and Enterprise JavaBeans (EJB), and a second phase analyzes the system's threads. These are the general areas that embodiments of the invention are intended to address.

SUMMARY

Described herein is a system and method for providing a static model map of behaviors in a middleware system, for use in identifying system problems. In accordance with an embodiment, the system provides a view of the system, such as a middleware system, which allows for analysis of the various components involved, such that analysis of one component does not affect the analysis of a second component. Locations within the middleware system where a particular request spends its time before returning a response are broadly categorized into either "wait" or "execution" locations. Irrespective of which request calls a component, the components exhibit the same behaviors which affect the response time of the request serviced. These exhibited behaviors are static and can be predefined for different types of components and analyzed independently of each other. In turn the behaviors can be similarly classified as either "wait" or "execution", each of which can be considered aspects of a component. Each aspect of a component must satisfy the same efficiency/inefficiency as defined by the requirements on the middleware system. An aspect that does not meet the criteria is considered a "problem aspect" and is analyzed further to find the cause of the problem.

DETAILED DESCRIPTION

Figure 1:
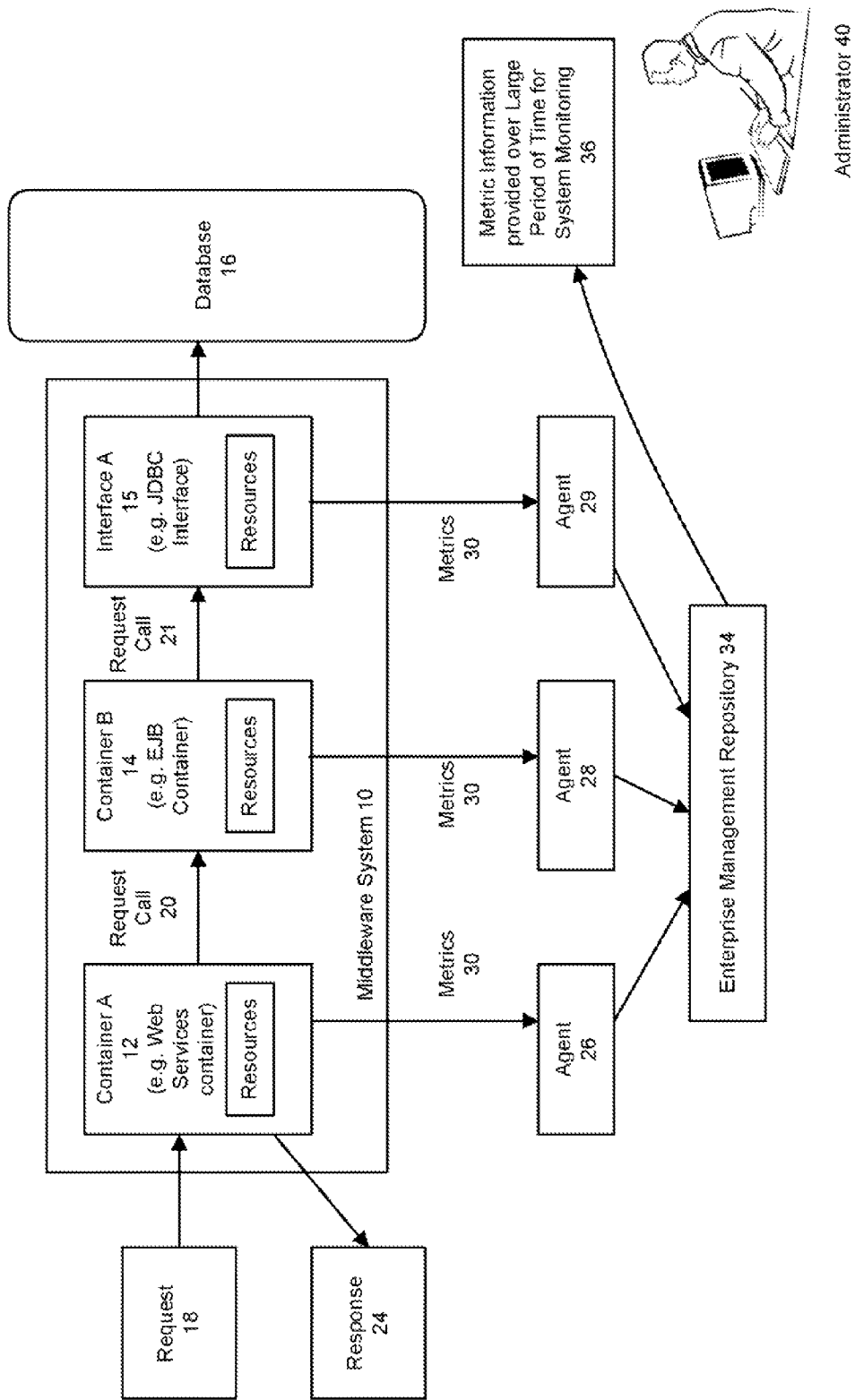
FIG. 1 illustrates a system, such as a middleware system, in accordance with an embodiment.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, the methods and techniques for measuring and diagnosing software misbehavior can be implemented in a software middleware system, such as an application server. Other types of middleware systems can also be utilized in conjunction with the various embodiments described herein, such as web servers, business process management (BPM) and process execution systems, enterprise service buses, service access gateways, messaging brokers and messaging systems, and the like.

DEFINITIONS

In accordance with an embodiment, as used herein, the term "efficiency" is used to refer to a computation with no units, and normalized against load. It is defined as the ratio of the number of requests in this sampling period that completed execution within the sampling period to the total number of requests that came in for processing in this sampling period. Though it is normalized against load, it will vary with load if load affected the behavior of the component and stay constant if not.

In accordance with an embodiment, as used herein, the term "inefficiency" is used to refer to the inverse of efficiency. It is defined as the ratio of the number of requests in this sampling period that is still executing at the end of this sampling period to the total number of requests that came in for processing in this sampling period.

In accordance with an embodiment, as used herein, the terms "performance indicator," "performance metric" and/or "performance indicator/metric" are used interchangeably to refer to any metric characterizing the response time, throughput or load on hardware or software components in a system.

In accordance with an embodiment, as used herein, the term "bottleneck" is used to refer to any situation in which performance of a system is diminished or otherwise compromised due to the poor performance of one or more components. The component or components causing the bottleneck are referred to herein as "bottleneck components."

In accordance with an embodiment, as used herein, the term "model" is used to refer to a hierarchical representation of the relations between components within middleware systems. A model can include a static hierarchy of component types, which is predefined or predetermined during the design phase, and dynamic relations, which are established between component instances during runtime.

In accordance with an embodiment, as used herein, the term "problem tree" is used to refer to a runtime instance of a model, represented as a tree of related components that exhibit performance problems at runtime. The components in a problem tree may or may not be "effects" of one another.

In accordance with an embodiment, as used herein, the term "link probability" is used to refer to a measure of co-occurrence of performance problems within components, which are known to be related to each other, by virtue of their links in a problem tree.

As described above, software middleware systems, such as Oracle WebLogic Server, typically use multiple components (e.g. software services, resources, and other components) that work together to process incoming requests. When a problem occurs in a higher level service this problem can be a manifestation of a misbehavior in one of the underlying components servicing the request. As such, to fully diagnose a problem with a particular request it is often necessary to look at all of the components in the middleware system that are participating in servicing that particular request. Tracking the various components through which a request flows, to detect those components contributing to a problem in the request, can be a complex undertaking. Generally, such an analysis mandates that for every request problem analyzed, a new set of components must also be analyzed to detect those particular components that contribute to that particular problem. It is possible that the same components are used by multiple requests, and hence one request may impact another request. As such, when the components are analyzed they need to be analyzed in the context of all requests coming into the system.

Described herein is a system and method for providing a static model map of behaviors in a middleware system, for use in identifying system problems. In accordance with an embodiment, the system provides a view of the system, such as a middleware system, which allows for analysis of the various components involved, such that analysis of one component does not affect the analysis of a second component. Locations within the middleware system where a particular request spends its time before returning a response are broadly categorized into either "wait" or "execution" locations, i.e. a request can either be waiting for a resource such as a thread or a JDBC data source; or can be executing, e.g. a SQL request using a JDBC data source or an EJB or a servlet code. Irrespective of which request calls a component, the components exhibit the same behaviors which affect the response time of the request serviced. These exhibited behaviors are static and can be predefined for different types of components and analyzed independently of each other. In turn the behaviors can be similarly classified as either "wait" or "execution", each of which can be considered aspects of a component. Each aspect of a component must satisfy the same efficiency/inefficiency as defined by the requirements on the middleware system. An aspect that does not meet the criteria is considered a "problem aspect" and is analyzed further to find the cause of the problem. Once the problem aspects are determined, runtime relations can be projected onto those problem aspects to further analyze component dependencies.

FIG. 1 illustrates a system, such as a middleware system, in accordance with an embodiment. As shown in FIG. 1, a typical middleware system 10 includes a plurality of resources, which in turn can be provided within containers 12, 14, such as Web Services or EJB containers, or as interfaces 15, such as a JDBC interface. A typical middleware system can also include a database 16, or provide access to one or more external databases. When a request 18 is received at the system, these resources are successively called or otherwise used 20, 21, to allow the system to eventually respond 24 to the request. Typically, individual resource usage information can be collected from the containers and interfaces by a plurality of agents 26, 28, 29 that are associated with the various containers and interfaces. The resource usage information or metrics 30 can be stored or otherwise provided to an enterprise manager repository 34. The information in the enterprise manager repository thus reflects an overview of metric information for the system over a relatively large period of time 36, and as such is useful for system monitoring by a system administrator 40. However, this form of metric information is of less use in identifying system problems when they occur.

Figure 2:
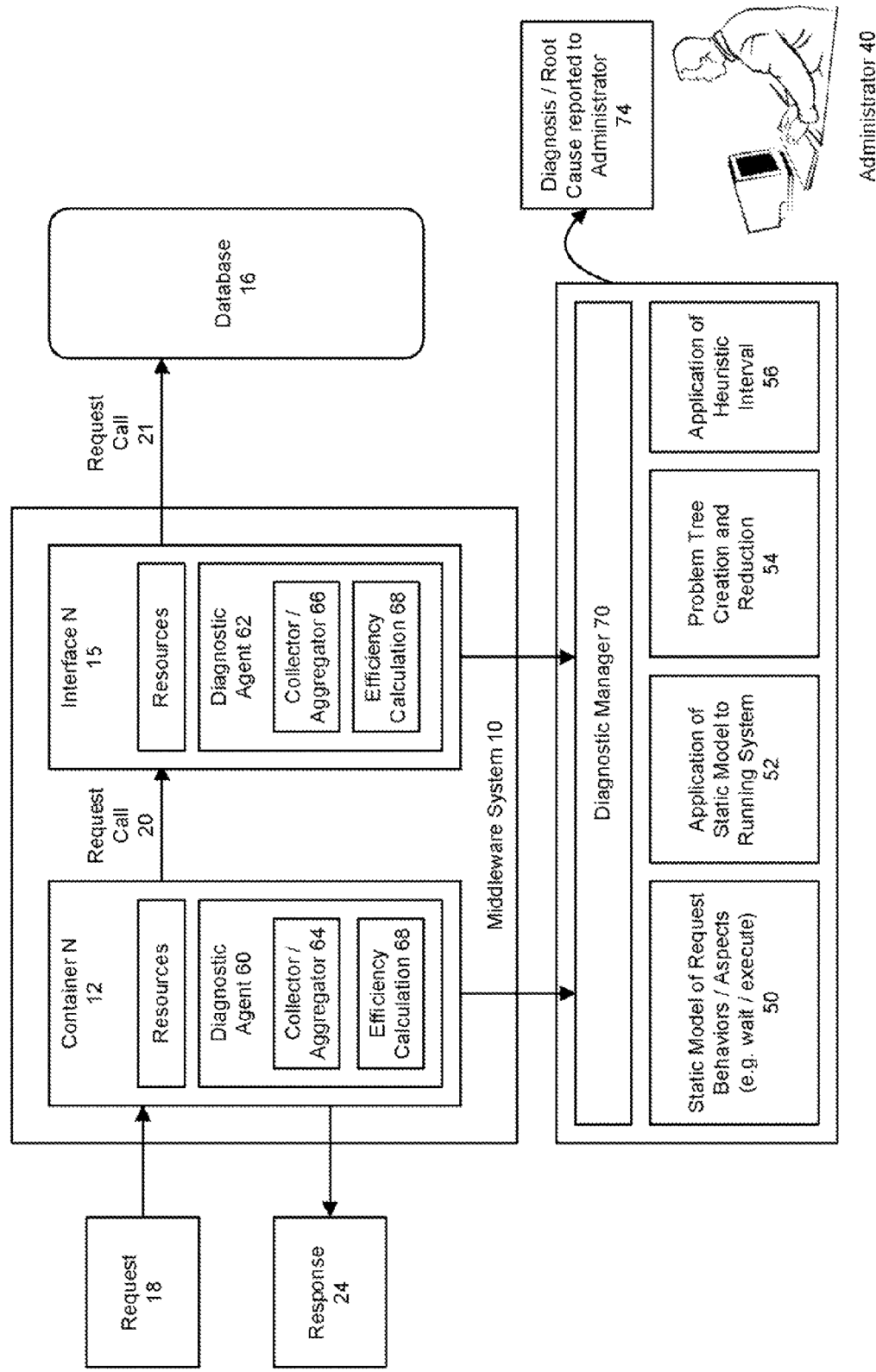
FIG. 2 illustrates a more detailed view of a system, such as a middleware system, that can be analyzed in accordance with an embodiment.

FIG. 2 illustrates a more detailed view of a system, such as a middleware system, in accordance with an embodiment. As shown in FIG. 2, the middleware system again includes a plurality of resources provided, e.g. as containers or interfaces, and again includes or provides access to one or more databases. In accordance with an embodiment, the system can allow definition of one or more of a static model of request behaviors 50, and allow application of the static model 52, to define behaviors within the current system configuration that are of most interest in problem identification (such as potential resource bottlenecks, or patterns of resource behavior that indicate potential problems). In accordance with an embodiment, a plurality of diagnostic agents 60, 62, coupled with collector/aggregators 64, 66, and a diagnostic manager 70, can provide information describing the runtime "efficiency" of a particular resource, within the context of this system. This information can then be used in combination with a problem tree 54, and heuristic interval 56, to provide diagnosis or the "root cause" 74 of a particular current system problem to the system administrator.

In accordance with an embodiment, locations within the middleware system where a particular request spends its time before returning a response are broadly categorized into either "wait" or "execution" locations. Irrespective of which type of request calls a particular component, that component will exhibit the same behaviors, which affects the response time of the request serviced. These exhibited behaviors are static and can be predefined for different types of components and analyzed independently of each other. In turn the behaviors can be similarly classified as either "wait" or "execution", each of which can be considered the aspects of the component. To determine whether a middleware system is running efficiently, or alternatively is experiencing problems, each aspect of a component must satisfy the same efficiency/inefficiency as defined by the requirements on the middleware system. An aspect that does not meet the criteria is considered a "problem aspect" and can be analyzed further to find the cause of the problem.

Figure 3:
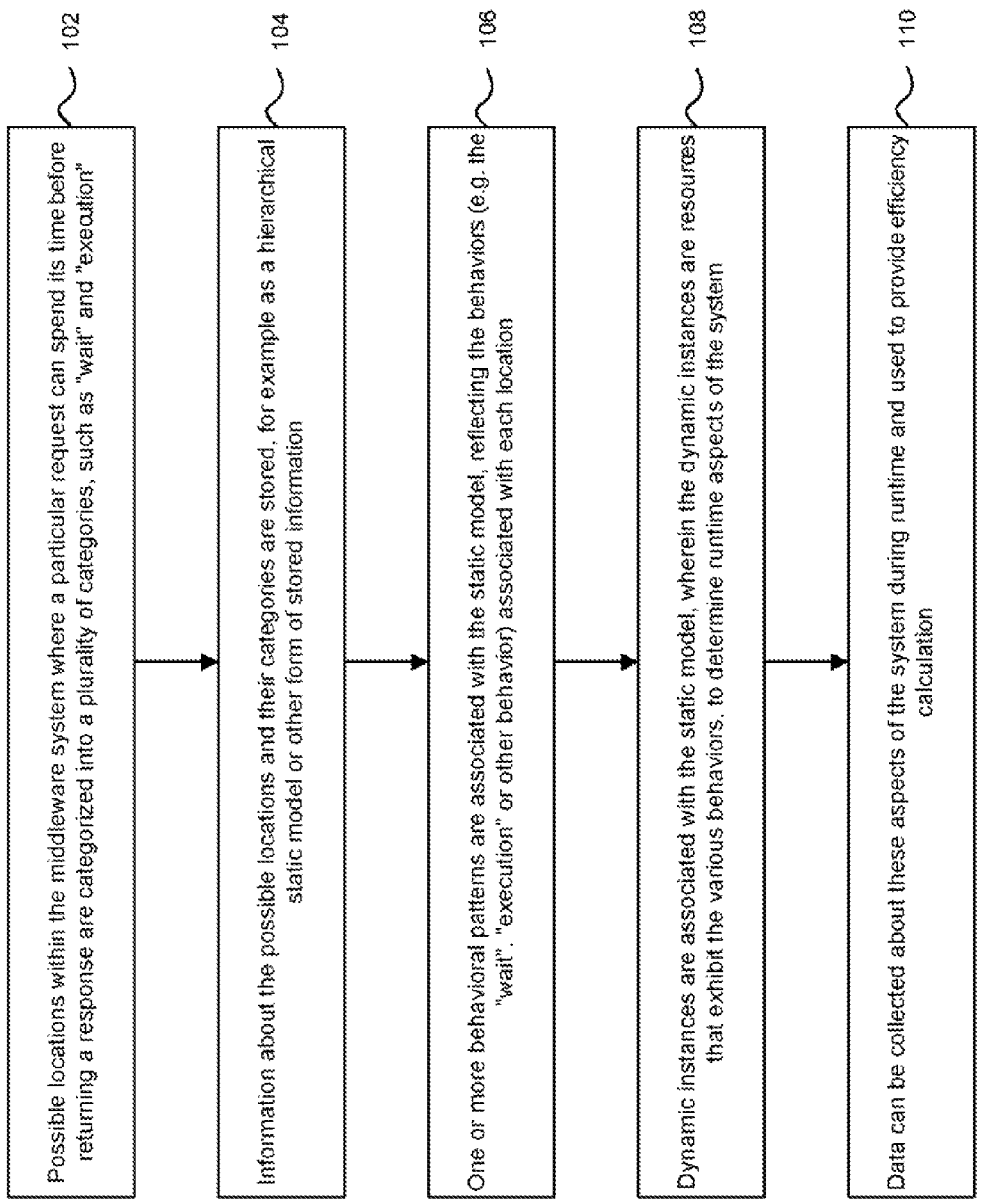
FIG. 3 shows a flowchart of a method for using a static model map or definition of a system, in accordance with an embodiment.
Figure 4:
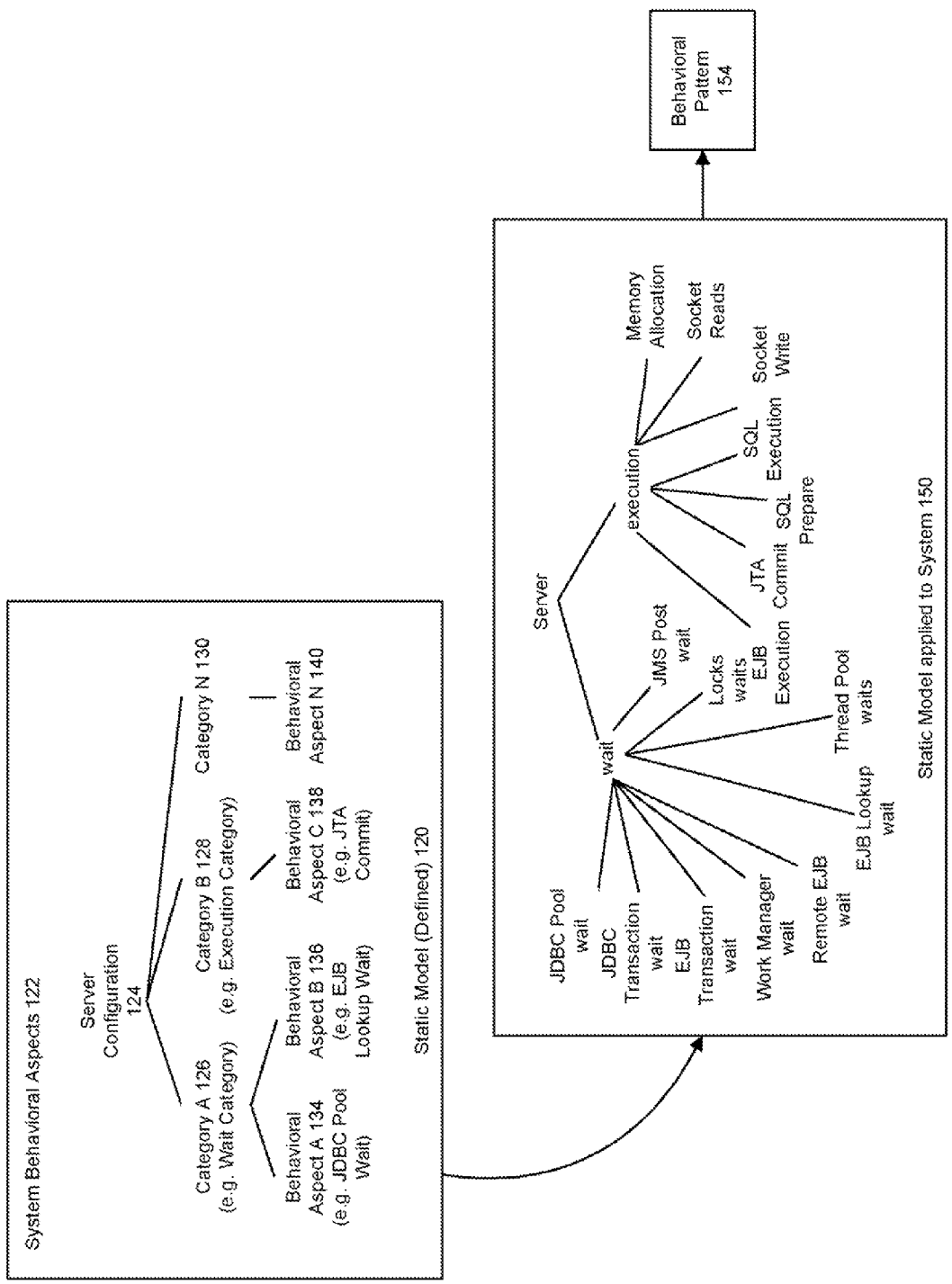
FIG. 4 illustrates a static model map or definition of a system, in accordance with an embodiment.

FIG. 3 shows a flowchart of a method for using a static model map or definition of a system, in accordance with an embodiment. As shown in FIG. 3, in step 102, the possible locations within the middleware system where a particular request can spend its time before returning a response are categorized into a plurality of categories, such as "wait" and "execution". In accordance with other embodiments other categories can be used. In step 104, information about the possible locations and their categories are stored, for example as shown in FIG. 4 as a hierarchical static model or other form of stored information, and are used to determine aspects. In step 106, one or more behavioral patterns are associated with the static model, reflecting aspects of most interest in determining problems. In step 108, dynamic instances are associated with the static model, wherein the dynamic instances are resources that exhibit the various behaviors, and which will be used to determine the runtime aspects of the system. In step 110, data can be collected about these aspects of the system during runtime and used to provide efficiency calculation.

FIG. 4 illustrates a static model map or definition of a system, in accordance with an embodiment. As shown in FIG. 4, the static model 120 defines system behavioral aspects 122 wherein the system configuration 124 is expressed as a plurality of categories A 126, B 128, through N 130, such as "wait" and "execution" categories. Behavioral aspects 134-140 of locations within the system are associated with each category, such as JDBC Pool Wait, EJB Lookup Wait, JTA commit, or other aspects. In accordance with an embodiment, grouping the various behaviors into different categories allows the system to assign behavioral patterns to them to identify the pattern that has to be checked for to detect a problem. For example, in some instance any "Increased Wait" is a problem; so the retention of requests in these aspects needs to be determined to detect a problem, while any "increase in execution time" is a problem and hence aspects that exhibit lower completion of requests should be identified as problem aspects. This knowledge is used to associate the static model with the system 150, and to determine the one or more behavioral patterns 154 reflecting aspects of most interest in determining problems.

Figure 5:
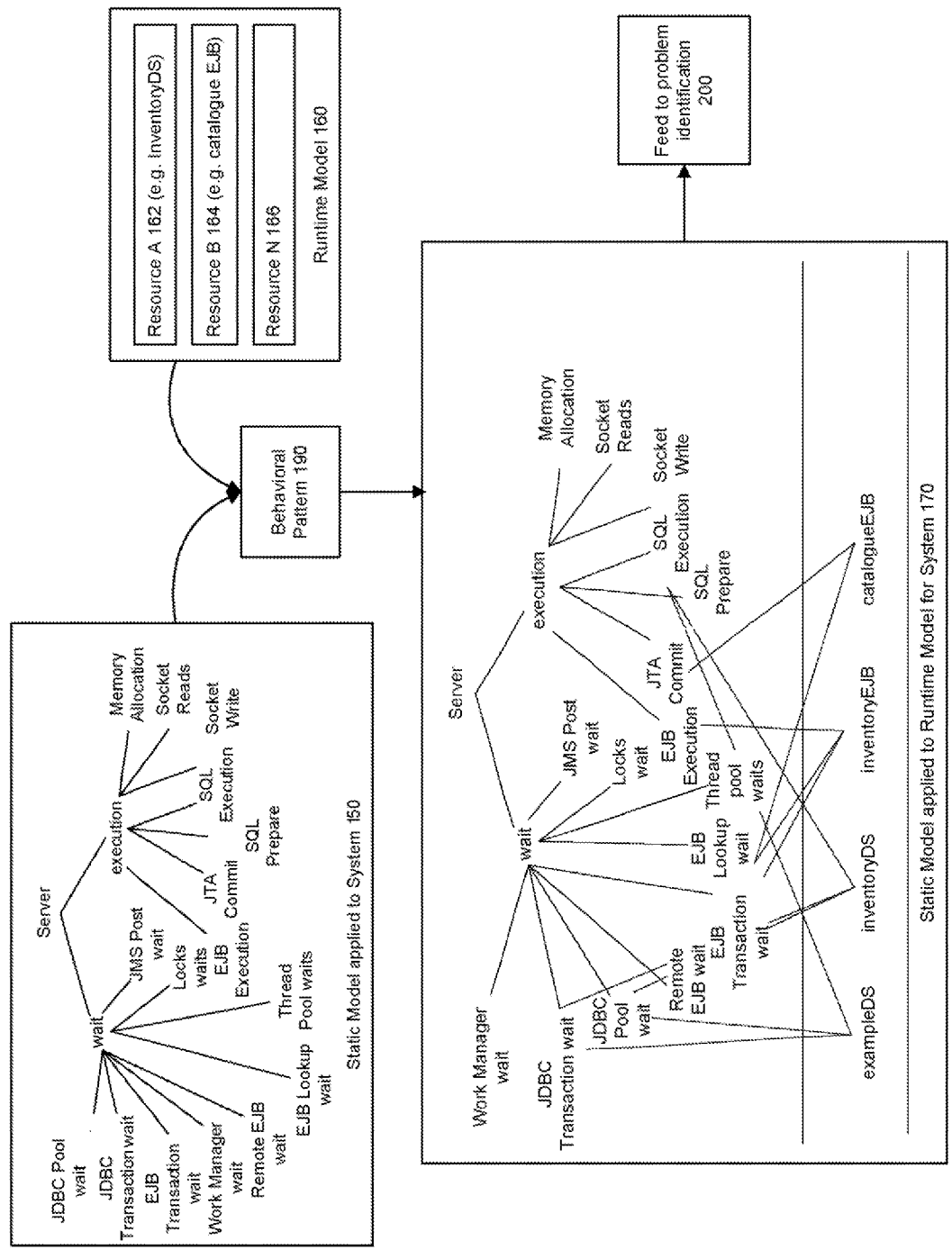
FIG. 5 illustrates how the static model can be used with a runtime system to help determine potential problems, in accordance with an embodiment.

FIG. 5 illustrates how the static model can be used with a runtime system to help determine potential problems, in accordance with an embodiment. In accordance with an embodiment, a runtime model 160 including a plurality of dynamic instances, such as Inventory DS 162 that exhibits both JDBC Pool Wait and JDBC Transaction Wait aspects; and CatalogueEJB that exhibits both Remote EJB Wait, EJB Transaction wait and EJB Execution aspects, is defined, and is associated with the static model, so that the model is applied to the dynamic instances 170 in accordance with the patterns of most interest 190. The associated information can be used to coordinate the calculation of efficiency of component in the system, and feed that information to a problem identification system 200.

The present invention may be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a static model map of behaviors in a middleware system, for use in identifying system problems comprising:
   a computer including a microprocessor;
   one or more components operable to receive a plurality of requests;
   a definition of a plurality of possible locations within a system where processing of a particular request, selected from the plurality of requests, takes place;
   a definition of the possible locations into a plurality of categories;
   a data defining a static model describing the possible locations and categories of the possible locations; and
   a logic, executing on the computer, for determining problems and component dependencies, including
      determining a plurality of behavioral aspects based on one or more static behaviors exhibited by the components, wherein the static behaviors are behaviors that remain unchanged at each component for all calling requests,
      associating the behavioral aspects and a plurality of dynamic instances with the static model,
      comparing the behavioral aspects against a plurality of predefined efficiency requirements, and
      based on the comparison, identifying at least one of the behavioral aspects as a problem aspect.

2. The system of claim 1, further comprising collecting runtime data and using the runtime data to provide an efficiency calculation.

3. The system of claim 1, wherein the categories include wait categories which represent locations at which the request is waiting and not being executed within the system, and execution categories which represent locations at which the request is executing within the system.

4. The system of claim 1, wherein the static model is a hierarchical model describing wait and execution categories and locations in the system in those categories.

5. The system of claim 1, wherein the dynamic instances are resources that exhibit behaviors.

6. A method, implemented on a computer including one or more microprocessors, for providing a static model map of behaviors in a middleware system, for use in identifying system problems comprising the steps of:
   receiving a plurality of requests with one or more components;
   defining a plurality of possible locations within a system where processing of a particular request, selected from the plurality of requests, takes place;
   categorizing the possible locations into a plurality of categories;
   storing information about the possible locations and categories of the possible locations as a static model;
   determining a plurality of behavioral aspects based on one or more static behaviors exhibited by the components, wherein the static behaviors are behaviors that remain unchanged at each component for all calling requests;
   associating the behavioral aspects and a plurality of dynamic instances with the static model;
   comparing the behavioral aspects against a plurality of predefined efficiency requirements; and
   based on the comparison, identifying at least one of the behavioral aspects as a problem aspect.

7. The method of claim 6, further comprising collecting runtime data and using the runtime data to provide an efficiency calculation.

8. The method of claim 6, wherein the categories include wait categories which represent locations at which the request is waiting and not being executed within the system, and execution categories which represent locations at which the request is executing within the system.

9. The method of claim 6, wherein the static model is a hierarchical model describing wait and execution categories and locations in the system in those categories.

10. The method of claim 6, wherein the dynamic instances are resources that exhibit behaviors.

11. A non-transitory computer readable medium including instructions stored thereon which, when executed by a computer, cause the computer to perform the steps comprising:
   receiving a plurality of requests with one or more components;
   defining a plurality of possible locations within a system where processing of a particular request, selected from the plurality of requests, takes place;
   categorizing the possible locations into a plurality of categories;
   storing information about the possible locations and categories of the possible locations as a static model;
   determining a plurality of behavioral aspects based on one or more static behaviors exhibited by the components, wherein the static behaviors are behaviors that remain unchanged at each component for all calling requests;
   associating the behavioral aspects and a plurality of dynamic instances with the static model;
   comparing the behavioral aspects against a plurality of predefined efficiency requirements; and
   based on the comparison, identifying at least one of the behavioral aspects as a problem aspect.

12. The system of claim 1, wherein one or more of the components are containers, each with a diagnostic agent that provides information describing runtime efficiency.

13. The system of claim 1, wherein one or more of the components are interfaces, each with a diagnostic agent that provides information describing runtime efficiency.

14. The method of claim 6, wherein one or more of the components are containers, each with a diagnostic agent that provides information describing runtime efficiency.

15. The method of claim 6, wherein one or more of the components are interfaces, each with a diagnostic agent that provides information describing runtime efficiency.

16. The computer readable medium of claim 11, further comprising the step of collecting runtime data and using the runtime data to provide an efficiency calculation.

17. The computer readable medium of claim 11, wherein the categories include wait categories which represent locations at which the request is waiting and not being executed within the system, and execution categories which represent locations at which the request is executing within the system.

18. The computer readable medium of claim 11, wherein the static model is a hierarchical model describing wait and execution categories and locations in the system in those categories.

19. The computer readable medium of claim 11, wherein one or more of the components are containers, each with a diagnostic agent that provides information describing runtime efficiency.

20. The computer readable medium of claim 11, wherein one or more of the components are interfaces, each with a diagnostic agent that provides information describing runtime efficiency.

* * * * *